(12) United States Patent
Jeong et al.

(10) Patent No.: US 7,107,476 B2
(45) Date of Patent: Sep. 12, 2006

(54) MEMORY SYSTEM USING NON-DISTRIBUTED COMMAND/ADDRESS CLOCK SIGNALS

(75) Inventors: Yong Gwon Jeong, Kyoungki-do (KR); Chang Ki Kwon, Seoul (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 389 days.

(21) Appl. No.: 10/293,473

(22) Filed: Nov. 14, 2002

(65) Prior Publication Data
US 2003/0097534 A1 May 22, 2003

(30) Foreign Application Priority Data
Nov. 21, 2001 (KR) ................................. 2001-72777
Oct. 16, 2002 (KR) ...................... 10-2002-0063256

(51) Int. Cl.
G06F 1/04 (2006.01)
G11C 8/00 (2006.01)
G06F 12/00 (2006.01)

(52) U.S. Cl. ........................ 713/500; 365/233; 711/167
(58) Field of Classification Search ...................... None
See application file for complete search history.

(56) References Cited

U.S. PATENT DOCUMENTS 3,920,916 A * 11/1975 Brightman et al. .......... 370/379
5,936,903 A * 8/1999 Jeng et al. ................... 365/203
6,029,250 A 2/2000 Keeth
6,191,632 B1 2/2001 Iwata et al.
6,266,750 B1 7/2001 DeMone et al.
6,313,674 B1 11/2001 Akita et al.
6,424,034 B1 * 7/2002 Ahn et al. ................... 257/723
6,877,079 B1 * 4/2005 Yoo et al. ................... 711/167
6,882,082 B1 * 4/2005 Greeff et al. ............... 310/307

* cited by examiner

Primary Examiner—Lynne H. Browne
Assistant Examiner—Anand B. Patel
(74) Attorney, Agent, or Firm—Pillsbury Winthrop Shaw Pittman LLP

(57) ABSTRACT

A memory system that includes a plurality of memory devices includes: a controller for outputting a first clock signal, a second signal and a plurality of command/address input signals corresponding to the plurality of memory devices, respectively; and a register and delay circuit unit for outputting command/address output signals after receiving the command/address input signals front the controller and then correcting transmission delay due to transmission lines; wherein the plurality of memory devices receive the command/address output signals from the register and delay circuit unit via the transmission lines, respectively, and sample the command/address output signals using the first clock signal directly inputted from the controller. As a result, the memory system can simplify the layout of semiconductor device design and prevent the collision of clocks.

19 Claims, 3 Drawing Sheets

# MEMORY SYSTEM USING NON-DISTRIBUTED COMMAND/ADDRESS CLOCK SIGNALS

BACKGROUND OF THE INVENTION

1. Field of the Invention

The present invention generally relates to memory systems comprising a plurality of memory devices, and more particularly, to a memory system for removing a command/address clock which samples command/address signals is removed.

2. Description of the Prior Art

A clock control device of conventional memory devices comprises a register chip for buffering command/address input signals and a phase locked loop chip for generating timing signals, in case of dual in line memory module 'DIMM'. When a plurality of PLL output clocks are generated in the PLL, a compensation capacitor (hereinafter, referred to as '$C_{comp}$') is used to control their edge timing.

FIG. 3 is a diagram illustrating an example of a conventional memory system using distributed command/address signals. A PLL circuit 20 edge controls address clocks 'CACLK' inputted from a controller 10 by using the $C_{comp}$, which compensates signal delay generated from transmission lines, and adjusts the edge-controlled CACLKS to have the same phase with the CACLKs inputted from the controller 10, and then applies the adjusted CLK0, CLK1, CLK2 and CLK3, to a plurality of memory devices 61, 62, 63 and 64, respectively. Here, a register 30 buffers a plurality of command/address input signals 'CAin' outputted from the controller 10, and outputs a plurality of command/address output signals 'CAout' to the plurality of memory devices 61, 62, 63 and 64, respectively, via transmission lines.

However, the conventional memory system has the following problems. First, since the conventional memory system should include the transmission lines to transmit clocks CLK0–CLK3 to the plurality of memory devices, the lay-out of semiconductor device design becomes complicated. Second, since the memory devices receive clocks CLK0–CLK3 and write data capture clocks 'WCLK', clock domain collision can be generated between clocks and write data capture clocks. Third, since each memory device should comprise an individual PLL or DLL circuit, jitter and cost of the whole system are increase. Fourth, since a register and a PLL circuit should be embodied using separate chips, the packaging process of semiconductor devices is complicated, thereby the packaging cost is increased. Finally, timing margins are degraded due to differences of a plurality of compensation capacitors.

SUMMARY OF THE INVENTION

In order to overcome the above described problems, the present invention has an object to provide a memory system which simplifies the lay-out of semiconductor device design by removing transmission lines for distributing command/address clocks CACLK, prevents clock domain collision by sampling command/address signals according to write data capture clocks WCLKs or clock signals divided into integer multiple, reduces cost without requiring an individual PLL or DLL circuit, improves jitter performance and prevents degradation of timing margins of system due to differences of compensation capacitor.

A preferred embodiment of the present invention has an object to provide a memory system for reducing cost due to unification of register chip, PLL or DLL chips.

DETAILED DESCRIPTION OF THE PREFERRED EMBODIMENTS

A disclosed memory system comprising a plurality of memory devices includes: a controller for outputting a first clock signal, a second clock signal and a plurality of command/address input signals to the plurality of memory devices, respectively; and a register and delay circuit unit for outputting command/address output signals after receiving the command/address input signals from the controller and then correcting transmission delay due to transmission lines; wherein the plurality of memory devices receive the command/address output signal from the register and delay circuit unit via the transmission lines, respectively, and sample the command/address output signals using the first clock signal directly inputted from the controller.

The disclosed memory system comprising a plurality of memory devices will be described in more details referring to examples below, when are not intended to be limiting.

Figure 1:
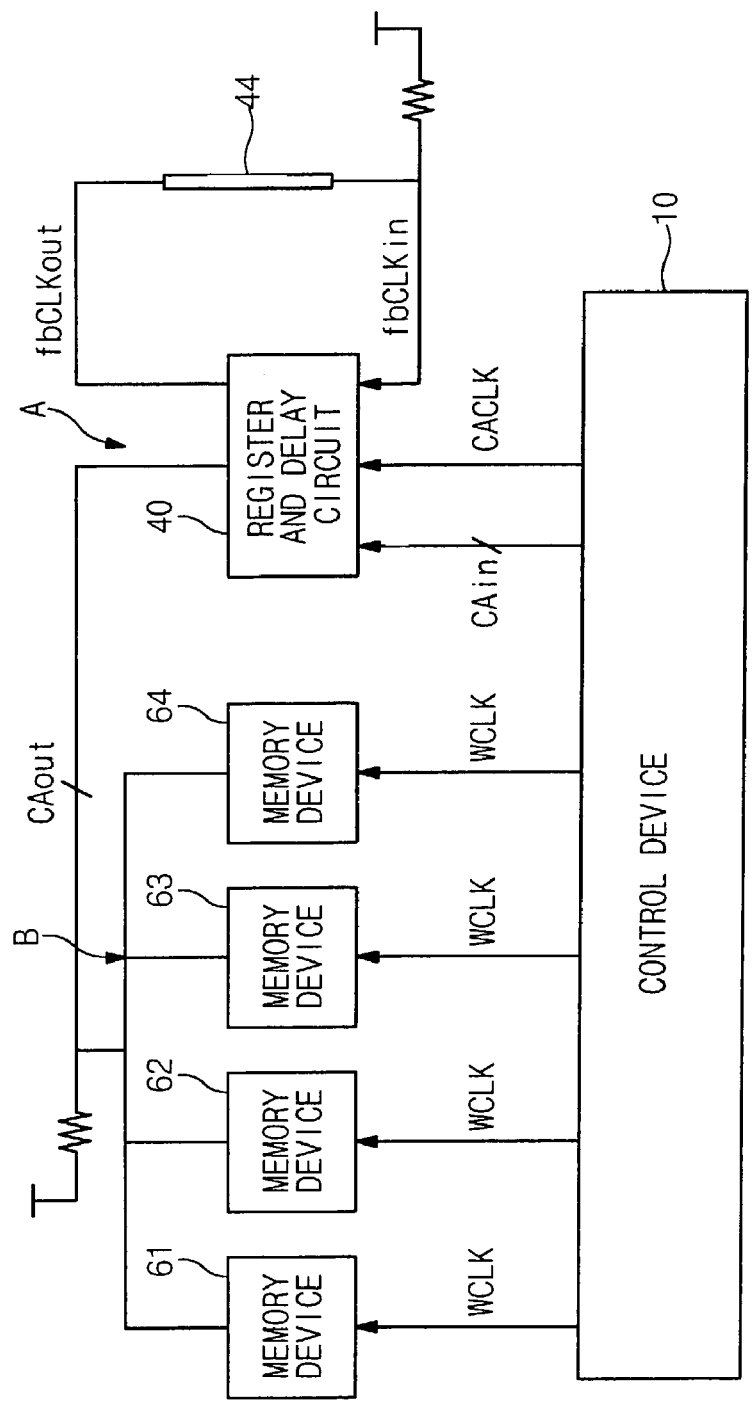
FIG. 1 is block diagram of a memory system in accordance with a preferred embodiment of the present invention.

FIG. 1 is block diagram of a memory system in accordance with a preferred embodiment of the present invention. As shown in FIG. 1, a controller 10 for controlling the whole operation of memory system applies command/address input signals CAin to a register and delay circuit unit 40.

The register and delay circuit unit 40 receives the command/address input signals CAin and outputs command/address output signals CAout after correcting transmission delay due to transmission lines connected to memory devices 61, 62, 63 and 64 and transmission delay generated in internal output buffer. It is preferable that the transmission delay means transmission delay ranging from a point (A) originated from the register and delay circuit 40 to a pre-determined point (B) in each of a plurality of transmission lines. The internal transmission delay may also include transmission delay generated in the internal register and delay circuit unit. The plurality of memory devices 61, 62, 63 and 64 receive command/address output signals CAout outputted from the register and delay circuit unit 40 via transmission lines, and then sample the command/address output signals CAout using write data clock (hereinafter, a first clock signal: WCLK) directly inputted from the controller 10. Accordingly, because of not using a separate command/address clock signals, the memory system of the present invention does not require separate transmission lines for command/address clock signals. Additionally, the collision is not generated between clock domains because a number of clocks are not inputted in memory devices but command/address signals CAout are sampled using only write data clock WCLK.

Figure 2:
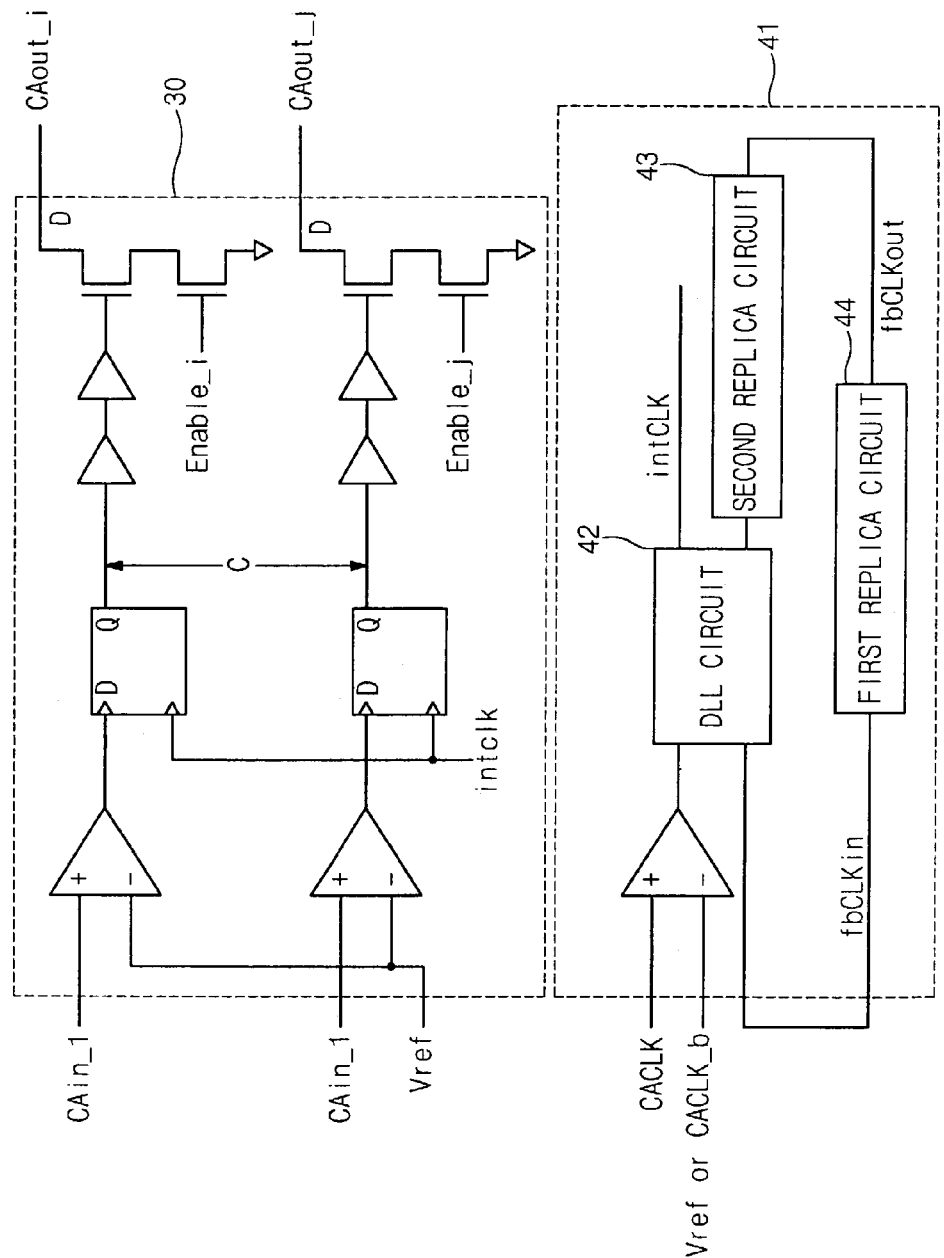
FIG. 2 is a detail diagram of a register and delay-circuit in accordance with a preferred embodiment of the present invention.
Figure 3:
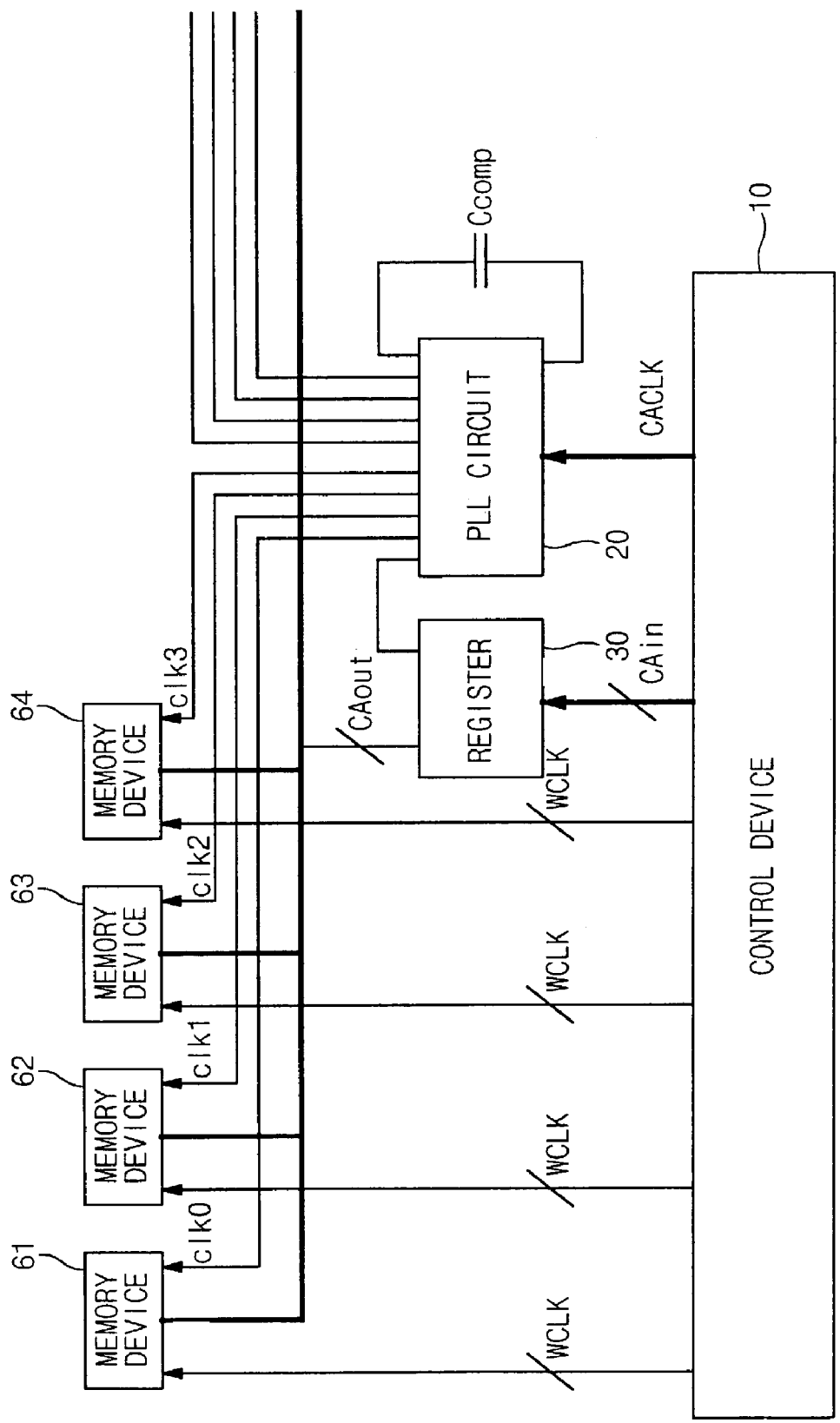
FIG. 3 is a block diagram of a conventional memory system using distributed command/address clock.

FIG. 2 is a detail diagram of a register and delay circuit in accordance with a preferred embodiment of the present invention.

A register unit 30 outputs command/address output signals CAout_i ~CAout_j by sampling command/address input signals CAin_i ~CAin_j using internal clock (hereinafter, referred to as a third clock signal: intCLK. Here, a clock control circuit 41 generates a third clock signal intCLK after correcting transmission delay due to transmission lines of command/address clock (hereinafter, referred to as a second clock signal: CACLK) inputted from the controller 10 and transmission delay generated in internal output buffer. It is preferable that the transmission delay means transmission delay ranging from a point (A) originated from the register and delay circuit 40 to a predetermined point (B). The internal output buffer transmission delay may also include transmission delay ranging from an output buffer input point (C) in the register and delay circuit unit 40 of command/address signal to an output point (D).

Preferably, as shown in FIG. 2, the clock control circuit 41 comprises a DLL circuit 42, a first replica circuit 44 for modeling transmission delay due to transmission lines and a second replica circuit 43 for modeling transmission delay of internal output buffer. The DLL circuit 42 receives a second clock CACLK from the controller 10, and re-receives a feedback signal (fbCLk_in) through the first and the second replica circuits 44 and 43, thereby correcting delay. As a result, the DLL circuit 42 generates a third clock intCLK which has the same phase with the feedback output signal. The first replica circuit 44 for modeling transmission delay in the register and delay circuit unit 40 and the memory devices 61, 62, 63 and 64 may be formed of combinations of common passive/active devices to adjust transmission delay, generally connected to the outside of chips. Preferably, the first replica circuit 44 may also be formed of command/address transmission line and termination circuit models to compensate differences in process/power voltage/temperature of PCB board. In addition, the second replica circuit for modeling transmission of internal output buffers may be preferably formed of output buffer circuit models in chips to compensate differences in process/power voltage/temperature of output buffers.

As discussed earlier, the disclosed memory system according so the present invention may simplify the lay-out of semiconductor device design because command/address clock signals are directly provided to memory devices. The memory system may also prevent the collision of clock domains by sampling command/address signals in memory devices using write data capture clocks. Besides, the memory system may reduce the cost and improve the jitter performance because it does not require separate PLL or DLL circuits, and prevent the degradation of timing margins of system due to differences in a plurality of compensation capacitors. Additionally, the present invention may provide a preferred embodiment which reduces the cost due to unification of register chip and PLL chip.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the sprit and scope of the invention as defined in the appended claims.

What is claimed is:

1. A memory system comprising a plurality of memory devices, including:
    a controller for outputting a first clock signal, a second clock signal and a plurality of command/address input signals corresponding to the plurality of memory devices, respectively, wherein the first clock signal is a write data clock and the second clock signal is a command/address clock; and
    a register and delay circuit unit for correcting transmission delay due to transmission lines, and outputting command/address output signals depending on the command/address input signals from the controller using the second clock signal;
    wherein the plurality of memory devices receive the command/address output signals from the register and delay circuit unit via the transmission lines, respectively, and sample the command/address output signals using the first clock signal directly inputted from the controller.

2. The memory system according to claim 1, wherein the register and delay circuit unit includes:
    a clock control circuit for correcting transmission delay due to the transmission lines, and outputting a third clock signal depending on the second clock signal from the controller; and
    a register unit for sampling the command/address signals using the third clock signal, and outputting the command/address output signal after buffering the command/address input signals of the controller.

3. The memory system according to claim 2, wherein the clock control circuit and the register unit are embodied into a single chip.

4. The memory system according to claims 2 or 3, wherein the clock control circuit comprises:
    a DLL circuit; and
    a first replica circuit for modeling transmission delay due to the transmission lines;
    wherein the DLL circuit adjusts the third clock signal to have the same phase as the second clock signal, and outputs the third clock signals of which transmission delay due to transmission line is corrected.

5. The memory system according to claim 4, wherein the first replica circuit is formed from the group consisting of PCB line model, active device, passive device and combinations thereof.

6. The memory system according to claim 2, wherein the clock control circuit corrects transmission delay due to the transmission lines and transmission delay from the register unit, and outputs the third clock signal depending on the second clock signal from the controller.

7. The memory system according to claim 6, wherein the clock control circuit and the register unit are embodied into a single chip.

8. The memory system according to claims 6 or 7, wherein the clock control circuit comprises;
    a DLL circuit;
    a first replica circuit for modeling transmission delay due to the transmission lines; and
    a second replica circuit for modeling transmission delay of the register unit;
    wherein the DLL circuit adjusts the third clock signal to have the same phase as the second clock signal, and outputs the third clock signals of which transmission delay due to transmission line and the transmission delay of the register unit are corrected.

9. The memory system according to claim 8, wherein the first and the second replica circuits are formed from the group consisting of PCB line model, passive device, active device and combinations thereof.

10. The memory system according to claim 1, wherein the transmission lines comprises global lines from the register and delay circuit unit to branchpoint, branched from the branchpoint and connected to a plurality of memory devices, respectively.

11. The memory system according to claim 10, wherein the transmission lines from the register and delay circuit unit to the plurality of memory devices is formed from the group consisting of daisy chain, hybrid T type and bifurcate.

12. The memory system according to claim 10, wherein the register and delay circuit unit comprises:
   a clock control circuit for correcting transmission delay due to the global transmission lines, and outputting a third clock signal depending on a second clock signal from the controller; and
   a register unit for sampling the command/address input signals using the third clock signal, and outputting the command/address output signals after buffering the command/address input signals.

13. The memory system according to claim 12, wherein the clock control circuit and the register unit are embodied into a single chip.

14. The memory system according to claims 12 or 13, wherein the clock control circuit comprises:
   a DLL circuit; and
   a first replica circuit for modeling transmission delay due to the global transmission lines;
   wherein the DLL circuit adjusts the third clock signal to have the same phase as the second clock signal, and outputs the third clock signals of which transmission delay due to the global transmission line is corrected.

15. The memory system according to claim 14, wherein the first replica circuit is formed from the group consisting of PCB line model, active device, passive device and combinations thereof.

16. The memory system according to claim 12, wherein the clock control circuit corrects transmission delay due to the global transmission lines and transmission delay in the register unit, and outputs a third clock signal after receiving a second clock signal from the controller.

17. The memory system according to claim 16, wherein the clock control circuit and the register unit are embodied into a single chip.

18. The memory system according to claims 16 or 17, wherein the clock control circuit comprises:
   a DLL circuit;
   a first replica circuit for modeling transmission delay due to the global transmission line; and
   a second replica circuit for modeling transmission delay in the register unit;
   wherein the DLL circuit adjusts the third clock signal to have the same phase as the second clock signal, and outputs the third clock signals of which transmission delay due to the global transmission line is corrected including transmission delay of the register unit.

19. The memory system according to claim 18, wherein the first and the second replica circuits are formed from the group consisting of PCB line model, active device, passive device and combinations thereof.

* * * * *